Figure 1:
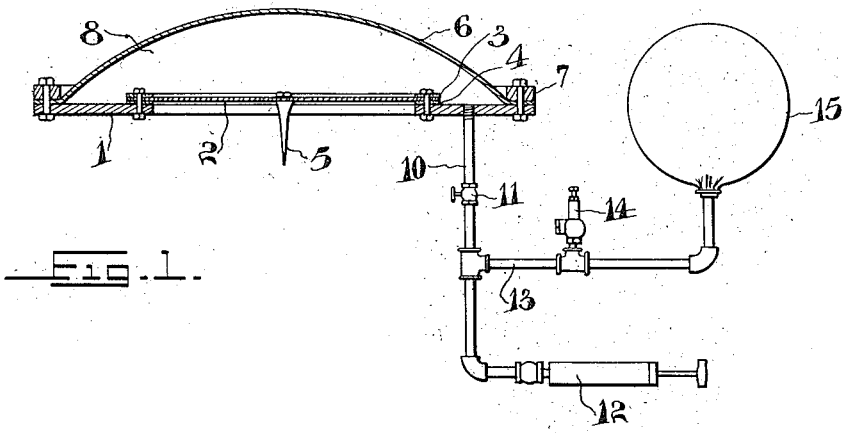

INVENTOR.
P. A. Robbins.
BY J. Edward Maybee
ATTY.

Patented Oct. 8, 1929

1,730,528

UNITED STATES PATENT OFFICE

PERCY A. ROBBINS, OF HIGHLAND PARK, ILLINOIS

ACOUSTIC TRANSFORMER

Application filed February 28, 1927. Serial No. 171,715.

This invention relates to devices for increasing the efficiency of a diaphragm in transmitting vibrations to or receiving vibrations from the atmosphere surrounding it.

In the art of translating, recording and reproducing sound waves, the usual method is to employ a diaphragm to convert atmospheric sound waves into mechanical movements, or vice versa, to convert mechanical movements into atmospheric sound waves.

When electricity is employed in the process, the electrical activity is induced by mechanical activity, or the electrical activity produces mechanical activity, and the mechanical activity of a diaphragm is the crux of all problems involving sound translation.

A diaphragm must be mechanically strong to permit of handling during manufacture and operation; it must be made of materials which will not quickly disintegrate, waste away, or assume changed characteristics.

These considerations involve the use of materials and dimensions which make the diaphragms comparatively heavy.

A diaphragm must be free to vibrate and it must have mechanical strength to deliver the vibrations to a transmitting pin, or other device, usually attached at its center, or to receive vibratory impulses from such a pin.

If a diaphragm be too flexible, it will distort and fail to deliver to the pin, or receive from the pin, a true translation of the vibratory impulses propagated through it. In cases where the diaphragm compresses carbon granules and thus varies the electrical conductivity of the granules, the same thing holds true, i. e. a too flexible diaphragm will distort and fail in correctly translating sounds. In cases where a magnetic diaphragm is vibrated by varying the intensity of a magnetic field in which it lies, the same thing holds true, namely, the diaphragm must be stiff enough to resist local distortion. Thus, a relatively stiff diaphragm is a necessity.

There is a limit however, to which the weight of the diaphragm may be carried, for the forces involved in sound translation are very small, and if the diaphragm possess too great a mass, it will not vibrate freely, as its comparatively great inertia will resist movement and thus distort the sound waves, and when in motion its great inertia will cause it to vibrate beyond the intended time, that is, its action will be sluggish.

The diaphragm cannot be too stiff and rigid for other reasons. The sound waves to be translated are of a very complex nature and a diaphragm must be flexible enough to become resolved into a great variety of nodes and anodes, in order to correctly translate the sound waves impressed upon it. Thus it is seen that while mechanical strength requires a comparatively stiff and heavy diaphragm, the requirements of satisfactory sound translation demand light weight and flexibility, and hence the diaphragm must be a compromise between these opposite demands.

There are certain conditions which impose a certain area upon a diaphragm surface. The diaphragm acts in conjunction with air, and in order to deliver the necessary energy from the air to the diaphragm, or from the diaphragm to the air, it is necessary to employ a definite number of air particles to propagate the energy. This involves a definite area of reaction between the diaphragm and the air, and fixes the dimensions of the diaphragm surface.

One object of my invention is to provide a means whereby the area, and therefore the thickness, and therefore the weight of the diaphragm may be reduced.

When a sound wave is propagated through air at atmospheric conditions, it impinges upon a diaphragm with a certain velocity of its particles due to their amplitude of vibration. The inertia of the diaphragm is so great that during acceleration a certain number of air particles rebound without having imparted their full store of energy to the diaphragm, and not until the diaphragm has acquired a velocity equal to one-half of the velocity of the air particles is there a full absorption of the energy of the sound wave. During retardation, the inertia of the diaphragm carries it too far ahead and it therefore fails to receive the energy of certain air particles.

Thus a considerable dissipation of energy occurs at the surface of the diaphragm, and the velocity of motion imparted to the diaphragm is much less than the velocity of the air particles.

When vibrations are emitted by the diaphragm and absorbed by the air particles, the converse is true. The diaphragm compresses an air wave at its surface owing to the elasticity of the air, and this air wave, owing to the energy stored in it, springs from the diaphragm with a greater amplitude of vibration than that of the diaphragm. Owing to the slight resistance opposed to the diaphragm by the air it is not possible to impart all of the energy of the diaphragm to the air and much of this energy is dissipated in doing internal work upon the substance of which the diaphragm is composed.

If a medium be opposed to the action of the diaphragm, which medium is capable of absorbing a greater amount of the energy stored in the vibrations of the diaphragm, then in order to produce a desired effect a less violent vibration of the diaphragm will produce the desired effect.

A second object of my invention is to provide such a medium.

Assume a closed vessel divided by an imponderable membrane into two compartments, A, and B, and each compartment filled with gas. Assume the gas in compartment A to be at normal density and the gas in compartment B to be at four times the normal density. If now a sound wave be propagated through the gas in compartment A it will strike the membrane with a force F and the velocity of the vibrations will be $v$. If the unit mass of the gas in compartment A, be M, then $F = Mv^2$ will be the relationship between the three functions F, M and $v$. If the mass of a unit of gas in compartment B be four times that in compartment A, then $F' = M'v'^2$: But the total force will be the same in both compartments for the force in compartment B will be exerted upon four times as many molecules as in compartment A. Hence $Mv^2 = M'v'^2$: By assumption $M' = 4M$; hence $v' = \frac{v}{2}$. That is, the velocity of vibration in compartment B will be one-half that in compartment A.

While in imponderable membrane has been assumed to separate the two compartments, it must possess sufficient mass for mechanical strength, hence in proportion to the mass, the velocity of the vibrations of the membrane particles will be slower than the velocity of the gas particles in compartment A. Thus the combined masses of the membrane and the gas particles of compartment B in contact with the membrane, will reduce the velocity of the vibrations received from the gas particles in compartment A.

Due to reflection of some of the sound-wave energy, and the work of bending the membrane, there will be a loss of energy at the membrane, but by making the membrane very thin this loss may be held within reasonable limits.

Reversing the premises, a sound wave propagated through the dense gas of compartment B will be translated into a similar sound wave in compartment A except that the velocity of the particles in compartment A will be twice that of the particles in compartment B (disregarding the inertia of the membrane.)

A further object of my invention is to apply this principle to the translation of sound-waves into mechanical movements, and vice-versa and thus avoid the use of horns which possess certain inherent defects.

A further object is to utilize the principle of the refraction of sound waves, whether the same are being produced by or impressed upon a diaphragm, to aid in increasing the efficiency of the exchange of vibrations between the diaphragm and the surrounding air.

I attain my objects by providing a closed chamber containing a gas, denser than air at atmospheric pressure, with a diaphragm exposed to the atmosphere, and by arranging a second and smaller diaphragm so that it may impart vibrations to or receive them from the dense gaseous medium.

In the preferred arrangement the dense gaseous medium is confined in lenticular form to refract the sound waves and the arrangement may be such as to concentrate or diffuse the sound waves emitted.

To obtain the best effects the chamber is divided into several lenticular compartments by intermediate diaphragms and gases of different densities are employed in the different compartments.

The invention is hereinafter more specifically described and is illustrated in the accompanying drawings in which Fig. 1 is a cross section of an acoustic transformer constructed in accordance with my invention; and Figs. 2 and 3 similar views of modified forms of the invention.

In the drawings like numerals of reference indicate corresponding parts in the different figures.

Referring particularly to Fig. 1, 1 is a plate of metal, hard-rubber or any material possessing the necessary stiffness and strength. This plate has an annular opening cut in it, as shown, and the diaphragm 2 covers this opening, being held in place by a ring 3 bolted to the plate. Soft-rubber packing rings 4 are provided to form tight joints and to support the diaphragm in an elastic bed.

5 is a stylus attached to the center of the diaphragm 2, which stylus is adapted for mechanical or electro-magnetic operation, or may be the recording stylus of a phonograph.

6 is a diaphragm or membrane of considerably greater area than the diaphragm 2 and preferably symmetrically disposed relatively to the same. This diaphragm is of curvilinear form in all cross sections and has its edges secured to the plate 1 by means of the ring 7 bolted to the plate. This diaphragm may be made of celluloid, hard-rubber, glass, soft-rubber, paper, oiled-silk, gold-beater's skin or any material sufficiently flexible or resilient and adapted to resist the passage of gases therethrough.

A chamber 8 formed by the plate and the two diaphragms is filled with some gas, such, for example, as sulphur-dioxide, which has a density greater than that of air at atmospheric pressure. This density may be increased by forcing the gas in under pressure and, indeed, to a certain extent at least, the required density of the gaseous filling may be obtained by filling the chamber under pressure with a gas having no greater density at atmospheric pressure than atmospheric air.

For the purpose of filling the chamber 8 I prefer to employ the apparatus shown which comprises a tube 10 screwed into a suitable opening in the plate 1 and provided with a stop-cock 11. This tube is connected with an air pump 12 of any suitable type. The tube is shown as provided with a branch 13, in which is located a safety valve 14, and which communicates with an elastic gas chamber 15. An even pressure is thus maintained in the chamber 8 by the elasticity of the walls of the gas chamber 15, while the possibility of producing a disruptive pressure is prevented by the safety valve 14.

If the device is to be used to convert sound waves into a mechanical movement of the stylus 5, the operation is as follows: Sound waves striking the diaphragm 6 forming one of the surfaces of the lenticular chamber 8 will be refracted by passing into the relatively dense gas in the chamber 8 and, because of the density of the gas, the amplitude of vibration of the waves will be reduced. The force of the waves will not be reduced except by any loss in the diaphragm 6, for although the vibrations are less violent, the dense gas provides a greater number of heavier particles for propagating the waves and the sum total of the forces are therefore the same and equal to the mass times the square of the velocity. Waves now impinge upon the diaphragm 2 and as by refraction they have been directed to strike the diaphragm more nearly at an angle approximately normal to the surface of the diaphragm they will exert a maximum force in moving the diaphragm. The amplitude of vibration having been greatly reduced by passing through the gas filled chamber 8, the rate of acceleration of the diaphragm 2 will need to be much less than if the waves were propagated through air at atmospheric pressure and density, and the absorption of the wave energy by the diaphragm 2 will be much greater than in the latter case.

Owing to the concentration of wave energy by refraction, and the more efficient transfer of energy to the diaphragm, and the concentration of more and heavier particles of gas at the surface of the diaphragm, the area of the diaphragm may be less than if the waves were delivered to it from air at atmospheric pressure and density.

The reduced size of the diaphragm and the reduced violence of vibration permit the diaphragm to be reduced in weight, thus aiding an improved translation of sound waves into mechanical movements.

It follows from the above that the device is equally advantageous when used to translate the movements of the stylus into sound waves at the outer surface of the diaphragm 6.

Figure 2:
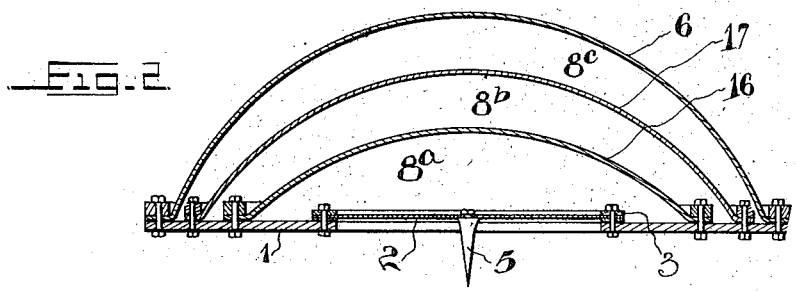
Figure 3:
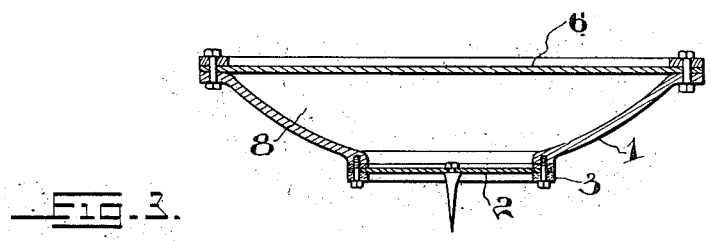

A preferred form is shown in Fig. 2. The spaces between the diaphragms 2 and 6 being divided into a plurality of compartments $8^a$, $8^b$ and $8^c$ by intermediate diaphragms or membranes 16 and 17. In this arrangement the compartments are filled with gaseous media progressively increasing in density. For example, the compartment $8^a$ may be filled with sulphur-dioxide, which has a relative density of about 2.2 when referred to air. The compartment $8^b$ may be filled with carbon-dioxide, which has a relativ. density of about 1.5 when referred to air and the compartment $8^c$ may be filled with oxygen, which has a relative density of about 1.1 when referrred to air. The densities of any of these gases may be increased by pressure, as hereinbefore referred to, or air may be used as the filling gas, in this case being employed at different pressure in the different compartments.

If the increase of density in the different compartments is from the diaphragm 2 towards the diaphragm 6, the sound waves are projected equally in all directions from the diaphragm 6. If it be desired to concentrate the air vibrations into a beam, the densities of the gaseous filling media may be reversed, the densest media being adjacent the diaphragm 6 and the least dense adjacent the diaphragm 2. The exact curvature of the curved diaphragms may vary according to conditions and the results desired. In Fig. 2 they are shown as of the same curvature. If very flexible material be employed for the diaphragm, it will usually be better to give the diaphragms a form which they tend to assume when subjected to an evenly distributed elastic pressure at one side. While I prefer to employ a curvilinear form for the larger diaphragms, I may give the plate 1 a segmento-spherical form, as shown in Fig. 3 in which case the diaphragm 6 may be made substantially flat, assuming that the chamber 8 is filled with a dense gas at very little, if any, pressure above that of the atmosphere. While I have shown in each case the diaphragm 2 as exposed at one side to the atmosphere and at the other side only to the chamber 8, any arrangement by which the stylus or pin may impart vibrations to or receive them from the dense gaseous medium in the chamber 8 would answer the purpose of my invention.

While I have used the term "gas" in the claims, this must be taken to include gaseous mixtures as well as simple gases.

What I claim is:

1. An acoustic transformer comprising a closed chamber containing a gas having a greater density than air at atmospheric pressure; and two independent diaphragms of different size adapted to receive or transmit vibrations from or to one another solely through the medium of the gas, the chamber being divided into a series of compartments by flexible diaphragms and the compartments filled with gas of progressively increasing density.

2. An acoustic transformer comprising a closed chamber containing a gas at more than atmospheric pressure; and two independent diaphragms of different size adapted to receive or transmit vibrations from or to one another solely through the medium of the gas, the chamber being divided into a series of compartments by flexible diaphragms and the compartments filled with gas of progressively increasing pressure.

3. An acoustic transformer comprising a closed chamber containing a gas having a greater density than air and at more than atmospheric pressure; and two independent diaphragms of different size adapted to receive or transmit vibrations from or to one another solely through the medium of the gas, the chamber being divided into a series of compartments by flexible diaphragms, and the compartments filled with gas of progressively increasing pressure and density.

4. An acoustic transformer comprising a closed chamber of lenticular form filled with a gas having a greater density than air at atmospheric pressure, one wall of the chamber being formed, in part at least, of a vibratable diaphragm; and a second diaphragm, opposite the first-mentioned diaphragm and independent thereof, adapted to impart vibrations to or receive them from the other diaphragm solely through the medium of said gas, the chamber being divided into a series of lenticular compartments by curved flexible diaphragms, and the compartments filled with gas of progressively increasing density.

5. An acoustic transformer comprising a closed chamber of lenticular form filled with a gas at more than atmospheric pressure, one wall of the chamber being formed, in part at least, of a vibratable diaphragm; and a second diaphragm, opposite the first-mentioned diaphragm adapted to impart vibrations to or receive them from said gas, the chamber being divided into a series of lenticular compartments by curved flexible diaphragms, and the compartments filled with gas of progressively increasing pressure.

6. An acoustic transformer comprising a closed chamber of lenticular form filled with a gas having a greater density than air and at more than atmospheric pressure, one wall of the chamber being formed, in part at least, of a vibratable diaphragm; and a second diaphragm opposite the first mentioned diaphragm adapted to impart vibrations to or receive them from said gas, the chamber being divided into a series of lenticular compartments by curved flexible diaphragms, and the compartments filled with gas of progressively increasing density and pressure.

7. An acoustic transformer comprising a chamber; a dome-shaped diaphragm forming at least part of one wall of the chamber; a gaseous medium within the chamber at more than atmospheric pressure; and means adapted to impart vibrations to or receive them from the diaphragm solely through the medium of the gas, the diaphragm having a form such as it tends to assume under the elastic pressure to which it is subjected.

Signed at Highland Park, Ill., this 15th day of February, 1927.

PERCY A. ROBBINS.